United States Patent [19]
Jordan

[11] 3,900,786
[45] Aug. 19, 1975

[54] HIGH VOLTAGE PULSE GENERATING CIRCUIT

[75] Inventor: Richard James Jordan, Roseville, Mich.

[73] Assignee: General Marine, Inc., Bromfield Hills, Mich.

[22] Filed: Dec. 21, 1973

[21] Appl. No.: 463,001

Related U.S. Application Data

[63] Continuation of Ser. No. 284,309, Aug. 28, 1972.

[52] U.S. Cl. ................................... 321/2; 321/15
[51] Int. Cl. ............................................. H02m 3/22
[58] Field of Search ...... 307/106, 108; 315/209 CD; 321/2, 15

[56] References Cited
UNITED STATES PATENTS

| | | | |
|---|---|---|---|
| 3,118,103 | 1/1964 | Mandoli et al. | 321/15 |
| 3,243,683 | 3/1966 | Ackley | 321/15 X |
| 3,259,829 | 7/1966 | Feth | 321/15 |
| 3,337,787 | 8/1967 | Joseph | 321/15 X |
| 3,349,284 | 10/1967 | Roberts | 321/15 X |
| 3,478,258 | 11/1969 | Nagai | 321/15 |
| 3,541,347 | 11/1970 | Carmack | 307/108 |
| 3,566,150 | 2/1971 | Nollace | 307/108 |
| 3,662,185 | 5/1972 | Sapir | 321/15 X |

*Primary Examiner*—R. N. Envall, Jr.
*Attorney, Agent, or Firm*—Paul J. Ethington

[57] ABSTRACT

A high voltage pulse generating circuit of the capacitor discharge type is disclosed. The circuitry is especially adapted for use with anti-personnel electric shocking devices and/or capacitor discharge ignition systems. The circuit comprises a transistor inverter which supplies an alternating voltage to a voltage doubler which charges a storage capacitor to a relatively high value. The storage capacitor is connected to a discharge circuit including the primary of a voltage transforming means through a thyristor such as a silicon controlled rectifier. Control means for the thristor is provided to turn it on when the voltage across the storage capacitor reaches a predetermined value. Alternatively, the pulses may be synchronized with an associated device and the control means turns on the thyristor in response to actuation of an external switch.

11 Claims, 3 Drawing Figures

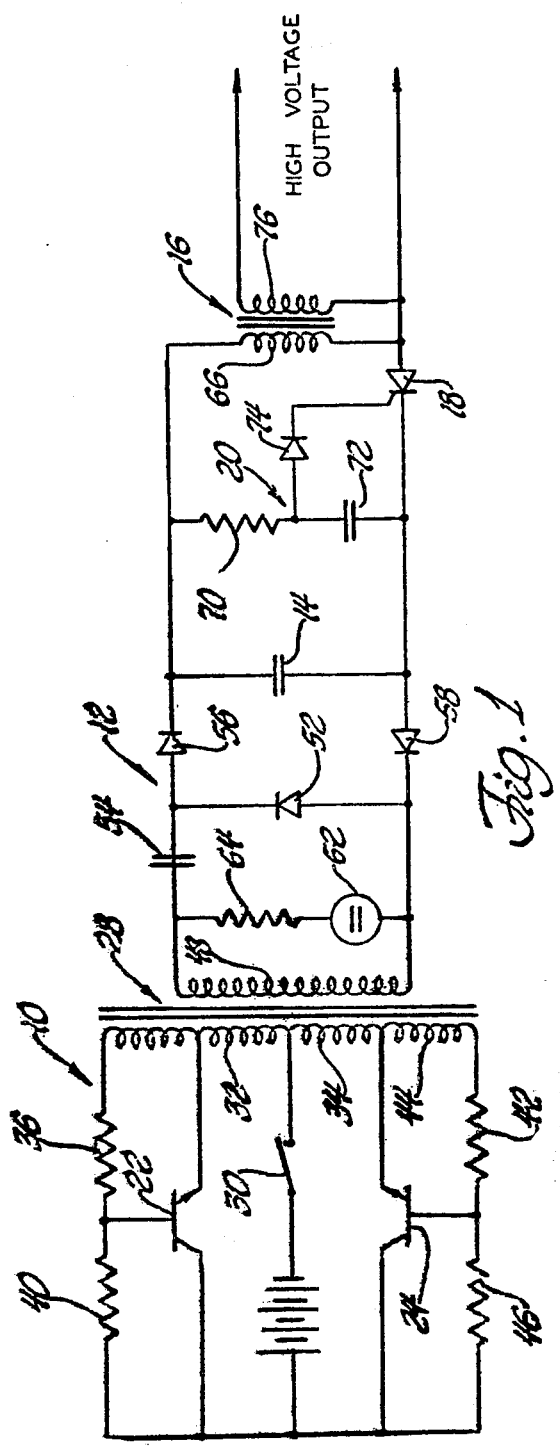
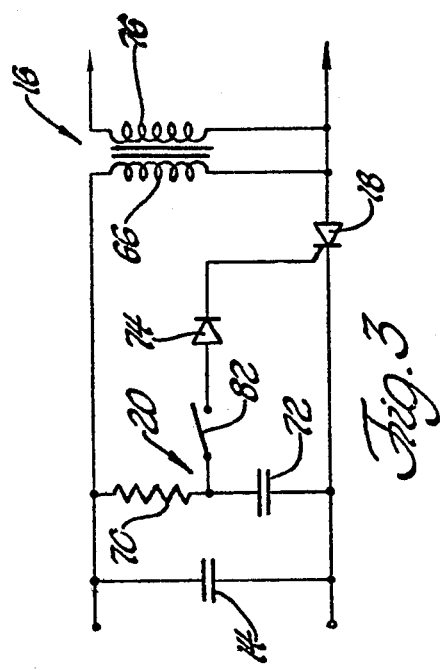
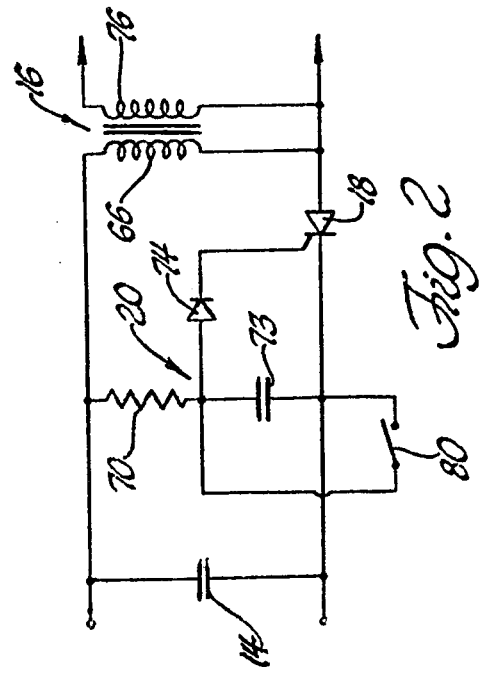

HIGH VOLTAGE PULSE GENERATING CIRCUIT

This is a continuation, of application Ser. No. 284,309, filed Aug. 28, 1972.

This invention relates to capacitor discharge circuits and more particularly to such circuits adapted to develop an output of high voltage pulses.

There are many applications of high voltage pulsing circuits for repetitively energizing a load device. The high voltage pulse circuit of the subject invention was developed especially for use in the power supply of an anti-personnel electric shocking device, such as that set forth in my copending application filed on even date herewith, Ser. No. 284,019 now U.S. Pat. No. 3,819,108, assigned to the assignee of this invention and entitled "Crowd Control Device." In such a device it is desirable to supply high voltage pulses to a set of electrodes in a repetitive manner regardless of whether the electrodes are open circuited, short circuited, or operated in a spark discharge mode. Further, it is desirable to supply a regulated or predetermined quantity of energy per pulse at a desired voltage level so as to assure effectiveness of the device without causing undue discomfort or pain to the victim. In such an application it is also desired that the power source utilize small portable batteries and accordingly, to maximize battery life, the high voltage pulse circuit operation, even in a short circuit mode, should not impose excessive current drain on the batteries.

Another well known application of high voltage pulsing circuit is that of supplying ignition voltage for internal combustion engines. Many forms of so called capacitor discharge ignition systems have been proposed in the prior art and a common difficulty has been encountered in the development of a sufficiently high voltage in charging the ignition or storage capacitor. A further problem in such systems is that of providing a regulated or predetermined quantity of energy in each pulse under widely varying conditions of operation. Further, difficulties have been encountered in obtaining circuit operation at high pulse repetition rates without the use of elaborate and complex circuitry. Previous attempts to utilize silicon controlled rectifiers for discharging the capacitor through the ignition coil have involved unduly complicated circuits for switching off the controlled rectifier.

In accordance with the present invention, a high voltage pulse generating circuit is provided which utilizes a capacitor discharge through a high voltage coil with predetermined voltage and energy per pulse at a desired pulse repetition rate. Such a device is realized utilizing a minimum number of circuit components. This is accomplished by the combination of an alternating voltage source, preferably in the form of a transistor inverter which is operative through a voltage doubler to charge a storage capacitor to a predetermined high voltage. A discharge circuit for the capacitor includes a thyristor, preferably in the form of a controlled rectifier, in series with a voltage transforming coil or output transformer with a load device such as voltage gap electrodes connected thereacross. The device includes control means connected with the gate of the thyristor for turning it on at controlled intervals whereby the capacitor is discharged through the voltage transforming means. Preferably the control means causes discharge during each cycle of the oscillator and the half-cycle of the oscillator following initiation of the discharge is effective to quench the thyristor, thereby preventing loss of controlled switching. The control means may take the form of an internal trigger circuit, or altnernatively, an external switch may be utilized to synchronize the pulse generation with the operation of an associated device.

A more complete understanding of this invention may be obtained from the detailed description that follows, taken with the accompanying drawings in which:

FIG. 1 is a schematic diagram of the inventive pulse generating circuit;

FIG. 2 shows a modification of a portion of the circuit; and,

FIG. 3 shows a further modification of a portion of the circuit.

Referring now to the drawings, there is shown an illustrative embodiment of the invention in a pulse generating circuit adapted to develop a train of high voltage pulses from a low voltage battery energized power supply. The illustrative embodiments of the invention are especially adapted to deliver a continuous train of pulses regardless of the condition of the load device, i.e., whether it is operated in a short circuit, open circuit, or gap discharge mode. Accordingly, it is especially suited for use in anti-personnel shocking devices and in capacitor discharge ignition systems.

As shown in FIG. 1, the invention comprises a transistor oscillator or inverter 10 which supplies alternating voltage to a voltage doubler 12, which in turn delivers charging current to a storage capacitor 14. The storage capacitor is connected with a voltage transforming means 16 through a thyristor 18. The thyristor is connected with control means 20 which turns on the thyristor at controlled intervals to discharge the capacitor 14 and thereby develop high voltage impulses across the output of the voltage transforming means 16.

Considering the circuit in greater detail, the inverter 10 suitably takes the form of a conventional pushpull transistor oscillator. As such, it comprises a pair of NPN power transistors 22 and 24, a direct voltage source such as a battery 26 and an output transformer 28. The transistor 22 has its output circuit from collector to emitter connected across the battery 26 through an on-off switch 30 and a primary winding 32 of the transformer 28. Similarly, the transistor 24 has its output extending from collector to emitter connected across the battery 26 through the switch 30 and a primary winding 34, which has one terminal in common with one terminal of the primary winding 32 and constituting a center tap on the combined windings 32 and 34. The transistor 22 has an input circuit from base to emitter, including a resistor 36 and a feedback winding 38. A forward bias for the transistor 22 is provided by a voltage divider comprising a resistor 40 and the resistor 36. Similarly, the transistor 24 has an input circuit extending from base to emitter through a resistor 42 and a feedback winding 44. A forward bias is provided for this transistor by a voltage divider comprising a resistor 46 and the resistor 42. The output transformer 28 is also provided with a secondary winding 48 which, in operation of the oscillator, produces an output alternating voltage.

The operation of a transistor oscillator of the type described is well known and need not be described in detail. Suffice it to say that upon closure of the switch 30, both of the transistors 22 and 24 are forwardly biased and both become conductive. However, because of inherent circuit unbalance one becomes more conductive than the other through its associated primary winding and consequently positive feedback to that transistor through the associated feedback winding drives that transistor quickly into saturation and the induced voltage in feedback winding of the other transistor drives it to cut-off. When current saturation is reached in the first transistor, the feedback voltage is reduced to zero and the decreasing current in the primary winding of the conductive transistor results in collapse of the magnetic flux and a reversal of polarity of the induced voltages in the feedback windings. Accordingly, the first transistor is cut-off and the other transistor becomes conductive and is driven to current saturation. This cycle of operation is repetitive at a frequency determined by the parameters of the oscillator circuit and consequently an alternating voltage is developed across the output terminals of the secondary winding 48. As is well known, the output voltage has a somewhat rectangular waveform due to the rapid switching characteristics of the transistors 22 and 24.

The voltage doubler 12 is adapted to charge the storage capacitor 14 toward a voltage value equal to twice the peak value of the alternating voltage of the secondary winding 48. For this purpose the voltage doubler comprises a first rectifying diode 52, connected in series with a holding capacitor 54 across the secondary winding 48. The circuit also includes a second rectifying diode 56 connected between the junction of capacitor 54 and diode 52 and one terminal of the storage capacitor 14. A blocking diode 58 is connected between the other terminal of the storage capacitor 14 and the other side of the diode 52. In the operation of the voltage doubler 12 the holding capacitor 54 will be charged through the rectifying diode 52 during one half-cycle of the alternating voltage toward the peak value of voltage across secondary winding 48. During this half-cycle the blocking diode 58 blocks current flow to the storage capacitor 14 and the rectifying diode 52 prevents discharge of the holding capacitor 54 through its charging circuit following the first half-cycle. During the succeeding half-cycle, with the polarity across the secondary winding reversed, the voltage thereof is additively combined with the voltage across the holding capacitor 54 in series with the rectifying diode 56, the storage capacitor 14 and the blocking diode 58. Accordingly, the storage capacitor 14 is charged toward a voltage equal to twice the peak value of voltage across the secondary winding. For the purpose of providing a visual indication of the operative condition of the inverter 10, a neon lamp 62 is connected across the secondary winding 48 with a series resistor 64 and hence is illuminated when the inverter is running.

The discharging circuit for the storage capacitor 14 extends through the primary winding 66 of the voltage transforming device 16 and thence through the output, i.e., anode to cathode of the thyristor 18 which preferably takes the form of a silicon controlled rectifier. As is well known, a thyristor is a rectifier of the solid state semi-conductor type which becomes forwardly conductive from anode to cathode when the voltage impressed thereacross exceeds a threshold value and when the current from the gate to cathode exceeds a predetermined value. The anode to cathode remain conductive, even after the gate to cathode current is reduced to zero, so long as voltage applied thereacross exceeds the threshold value. Thus the thyristor or silicon controlled rectifier 18 is turned on only by the requisite gate current and can be turned off only by the requisite reduction of cathode to anode voltage to quench the output.

The control means 20 for controlling the turn-on of the thyristor 18 is adapted to correlate the switching point with the value of voltage across the storage capacitor 14. For this purpose the control circuit comprises a voltage divider including a resistor 70 and a capacitor 72 in series across the storage capacitor 14. A voltage threshold device, such as a semi-conductor diode 74, poled for forward conduction, is connected between the junction of resistor 70 and capacitor 72 and the gate of the thyristor 18. Thus the input of the thyristor 18 is connected across the voltage divider capacitor 72 and when the voltage across the capacitor reaches a predetermined value the diode 74 will conduct in the forward direction and the requisite turn-on current will flow from gate to cathode in the thyristor 18 and thereby trigger or turn-on the thyristor. This allows the storage capacitor 14 to discharge through the thyristor and the primary winding 66 of the voltage transforming device 16 and thereby develop a high voltage pulse in secondary winding 76 which is connected across a suitable load device, such as a pair of voltage gap electrodes. The voltage transforming means 16 preferably takes the form of a high voltage spark coil with the primary and secondary windings having a common connection which constitutes an intermediate tap on a single coil and serves as a common return or ground conductor. Thus the transforming means has the configuration of an auto-transformer, as is commonly used for ignition coils.

Operation of the inventive high-voltage pulse generating circuit is as follows: When the switch 30 is closed the inverter 10 is operative and produces an alternating output voltage across the secondary winding 48. On each full cycle of the oscillator 10 the storage capacitor 14 is charged toward a value equal to twice the peak value of the alternating voltage across the secondary winding. During the first half-cycle the capacitor 54 is charged and during the second half-cycle the voltage across the capacitor 54 and the voltage across the secondary winding 48 are additively combined across the storage capacitor 14, whereby it is charged toward a value equal to twice the peak voltage across the transformer secondary. As the capacitor 14 is charged, the voltage thereacross is also applied across the voltage divider including the series resistor and capacitor 72. During this charging interval the thyristor 18 is turned off and accordingly no current flows through the primary winding 66 of the coil 16. As the voltage across the capacitor 14 rises toward its peak value the voltage across the capacitor 72 also increases until the output of the voltage divider 20 exceeds the threshold value for forward conduction of the diode 74. At this point the diode 74 becomes conductive and the current flow from gate to cathode of the thyristor 18 is sufficient to turn on the thyristor which thereupon connects the primary winding 66 directly across the storage capacitor 14. A discharging circuit is thus completed through the primary winding of the coil 16 and the resulting primary current impulse produces a high voltage output pulse across the secondary winding 76. The capacitor 14 is quickly discharged through the thyristor 18 and the thyristor is turned off in readiness for the next cycle of operation. The turn-off or quenching of the thyristor 18 is believed to be accomplished in either of two ways depending upon the operating conditions. When the high voltage across the secondary winding 76 is allowed to discharge, the energy in capacitor is exhausted, thereby terminating current flow through the thyristor. When the high voltage across the secondary winding is not allowed to discharge, the reflected counter electromotive force in the primary winding 66 terminates the current flow through the thyristor. Thus the thyristor 18 is turned off at the end of the first cycle and the succeeding cycle commences. As previously described, the first half-cycle thereof is operative to charge the capacitor 54 and the second half-cycle is operative to apply the transformer secondary voltage and the voltage of capacitor 54 to the storage capacitor 14. When a predetermined voltage is reached, the control circuit 20 turns on the thyristor to discharge the capacitor 14 through the primary winding 66 to produce a high voltage pulse in the output winding 76, as previously described. This operation is repetitive at a rate depending upon the time constant of the resistor 70 and capacitor 72 with a maximum corresponding to the frequency of the transistor oscillator 10. A train of high voltage output pulses is produced across the secondary winding of the transforming means 16.

It is to be noted that the inventive high voltage pulse generating circuit is operative to produce a train of high voltage pulses, all of which represent or contain a predetermined quantity of energy. This type of operation is achieved because the storage capacitor 14 is discharged only after it has been charged to a predetermined value of voltage. Such operation is achieved even though the output of the oscillator 10 may vary due to fluctuations in voltage of the battery 26. Further, it is to be noted that the output pulse energy remains substantially the same regardless of the impedence of the load device across the secondary winding. The circuitry is capable of operating with a short circuit across the secondary winding 76 without imposing any more drain on the battery 26 than when it is operated with normal load or under open circuit conditions. This operation obtains because only a fixed amount of energy is transferred to the load or output circuit during each discharge period of the capacitor 14. In effect, the load or output circuit is disconnected from the capacitor 14 during the charging interval and the oscillator and battery are disconnected from the capacitor 14 and hence the output circuit during the discharging interval.

In the modification of the invention as shown in FIG. 2 the control means 20 is adapted to permit synchronization of the output pulses with an external device. This modification is especially adapted for use in a capacitor discharge ignition system wherein the output pulses are applied to the distributor of the spark ignited engine for sequential application to the spark plugs.

Referring now to FIG. 2, it is noted that only the modified portion of the pulse generating circuit is shown, it being understood that the remaining portion is identical to that of FIG. 1. As shown in FIG. 2, the control means 20 is modified to include a voltage divider comprising the resistor 70 and a capacitor 73 connected in series across the storage capacitor 14. Additionally, a switch 80, such as the breaker points of an ignition system are connected across the capacitor 73, which constitutes the output of the voltage divider. The operation of this embodiment of the invention is the same as that described with reference to the circuit of FIG. 1, except that the switching of the thyristor 18 is controlled by the switch 80 and the voltage across the storage capacitor 14. When the switch 80 is closed the capacitor 73, and hence the output of the voltage divider, is short circuited and there is no input current to the gate of the thyristor 18. When the switch 80 is opened the voltage across the capacitor 73 is a function of the voltage across the storage capacitor 14. Accordingly, when this voltage exceeds the threshold voltage of the diode 74 the thyristor 18 is turned on and the storage capacitor 14 is discharged to produce the output pulse in the manner previously described.

The circuit of FIG. 3 is a modification of the invention which is also adapted for synchronization of the output pulses with an associated device such as in a capacitor discharge ignition system. FIG. 3 shows only that portion of the circuit which is different from the circuit of FIG. 1. The control means 20 comprises a voltage divider including the resistor 70 and the capacitor 72. Additionally, a switch 82 is serially connected between the junction of the resistor 70 and capacitor 72 and the gate of the thyristor 18. Accordingly, the output of the voltage divider is taken across the capacitor 72 and is applied through the switch 82 and, if desired, the diode 74 to the gate of the thyristor. In operation, the initiation of each output pulse depends upon closure of the switch 82 and the voltage across the storage capacitor 14. With the switch 82 open no input current can be supplied to the gate of the thyristor 18 and it remains nonconductive. The voltage across capacitor 72 is dependent upon the voltage across the storage capacitor 14 and upon closure of the switch 82, the voltage across capacitor 72 will be sufficient to produce the requisite trigger current for the thyristor 18 to cause it to become conductive. Thus an output pulse is produced upon each closure of the switch 82.

Although the description of this inventon has been given with reference to a particular embodiment, it is not to be construed in a limiting sense. Many variations and modifications will now occur to those skilled in the art. For a definition of the invention reference is made to the appended claims.

The embodiments of the present invention in which an exclusive property or privilege is claimed are defined as follows:

1. A high voltage pulse generating circuit comprising an alternating voltage source, a charging circuit including a coupling capacitor, a rectifier and a storage capacitor connected in series across said source, a thyristor including an anode, a cathode and a gate, a discharging circuit including the anode and cathode of the thyristor, and an induction coil connected in series across said storage capacitor, and control means connected with the gate of said thyristor for turning on the thyristor at controlled switching intervals to discharge the storage capacitor through said induction coil, the frequency of said source being high enough in relation to said controlled switching intervals so that there is at least one charging cycle for each switching interval whereby there is at least one discharging cycle during each switching interval, said coupling capacitor being the sole charging path for said storage capacitor whereby the current drawn from said source during the discharge cycle is limited by the impedance of said coupling capacitor.

2. The invention as defined in claim 1 wherein said alternating voltage source is the pushpull transistor oscillator.

3. The invention as defined in claim 1 wherein said control means causes discharge of said storage capacitor during each cycle of said oscillator and the half-cycle of said oscillator following initiation of said discharge is of a polarity to quench said thyristor.

4. The invention as defined in claim 1 wherein said rectifier is a first rectifying diode, a second rectifying diode connected from the junction of the first rectifying diode and the coupling capacitor to one terminal of said storage capacitor and a blocking diode connected between the other terminal of the first rectifying diode and the other terminal of said storage capacitor.

5. The invention as defined in claim 1 wherein said thyristor is a silicon controlled rectifier.

6. The invention as defined in claim 1 wherein said control means comprises an impedance element connected between said gate and a point in said discharging circuit which is at an electrical potential different from said cathode when said storage capacitor is charged.

7. The invention as defined in claim 6 including a voltage threshold device connected in series with said gate.

8. The invention as defined in claim 7 wherein said impedance element is a part of a voltage divider which includes a capacitor.

9. The invention as defined in claim 6 wherein said control means further comprises a switch connected between the gate and cathode.

10. The invention as defined in claim 6 wherein said control means further comprises a switch connected in series with said impedance element and said gate.

11. The invention as defined in claim 1 wherein said frequency is high enough in relation to said control switching intervals so that there are two or more charging cycles for each switching interval, whereby there are two or more discharging cycles during each switching interval.

* * * * *